(12) United States Patent
Boyd

(10) Patent No.: US 10,589,587 B2
(45) Date of Patent: Mar. 17, 2020

(54) AMPHIBIOUS VEHICLE

(71) Applicant: Neil Doveton Boyd, New Plymouth (NZ)

(72) Inventor: Neil Doveton Boyd, New Plymouth (NZ)

(*) Notice: Subject to any disclaimer, the term of this patent is extended or adjusted under 35 U.S.C. 154(b) by 16 days.

(21) Appl. No.: 15/849,630

(22) Filed: Dec. 20, 2017

(65) Prior Publication Data
US 2018/0208008 A1    Jul. 26, 2018

(30) Foreign Application Priority Data
Dec. 21, 2016 (NZ) .......................... 727865

(51) Int. Cl.
*B60F 3/00* (2006.01)

(52) U.S. Cl.
CPC .................. *B60F 3/0015* (2013.01)

(58) Field of Classification Search
CPC .... B62D 55/28; B62D 55/283; B62D 55/286; B60F 3/0015; B60F 2301/00; B60F 2301/04; B60F 2301/10; B60F 2301/12
See application file for complete search history.

(56) References Cited

U.S. PATENT DOCUMENTS 8,002,596 B2 * 8/2011 Wernicke .............. B60F 3/0007
114/285

* cited by examiner

*Primary Examiner* — Andrew Polay
(74) *Attorney, Agent, or Firm* — JCIP; Joseph G. Chu; Jeremy I. Maynard

(57) ABSTRACT

An amphibious vehicle that is capable of being reconfigured to operate both on land and in water is disclosed. The amphibious vehicle includes at least a hull and at least a deployable endless track running on a track assembly. The track assembly may comprise a four bar mechanism having an upper member fixed relative to the hull and a lower member configured to be actuated between an undeployed and a deployed positions, where in a deployed position the upper and lower members of the four bar mechanism are further apart than in an un-deployed position. The endless track is guided by upper guide wheels and lower guide wheels, wherein the upper guide wheels are fixed to the hull and the lower guide wheels are fixed relative to the lower member.

16 Claims, 4 Drawing Sheets

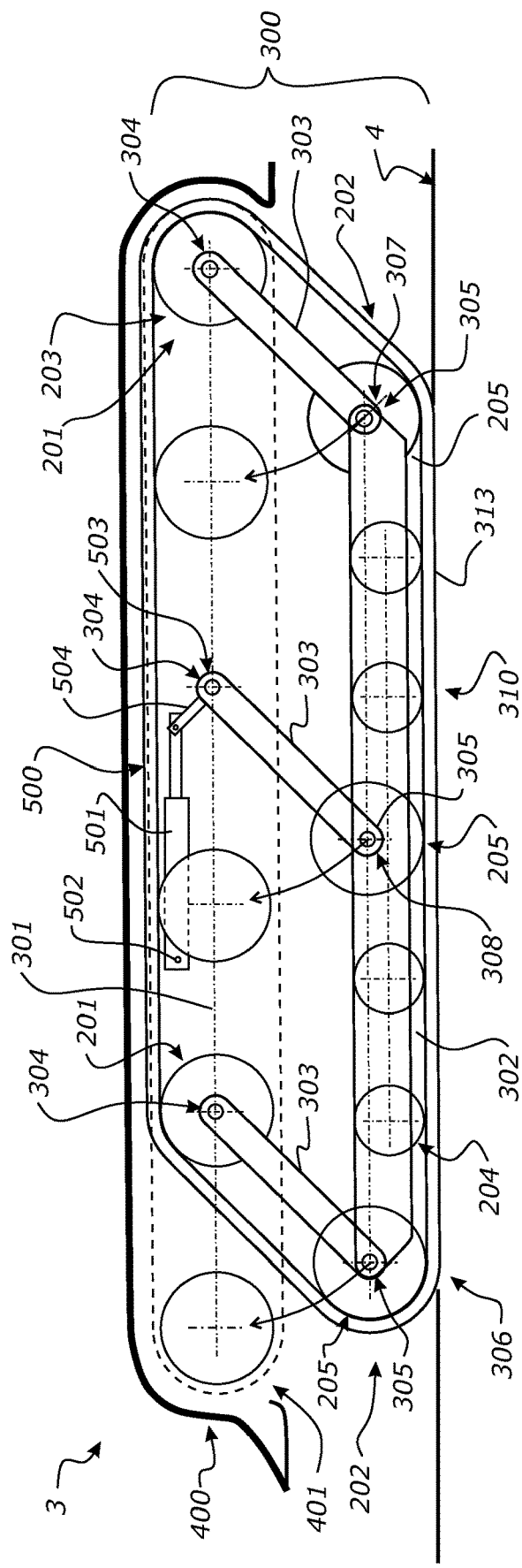
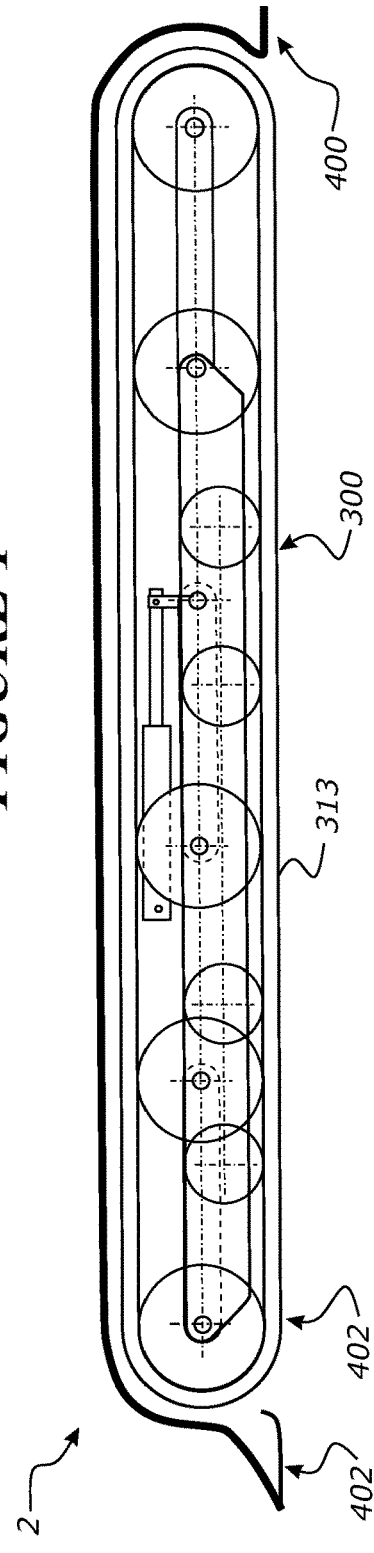
FIGURE 1
FIGURE 2

AMPHIBIOUS VEHICLE

RELATED APPLICATION INFORMATION

The present application claims priority to the New Zealand Patent Application No. 727865 with the filing date of Dec. 21, 2016 entitled "AMPHIBIOUS VEHICLE," the disclosure of which is incorporated herein by reference in its entirety.

BACKGROUND OF THE INVENTION

1. Field of the Invention

The present invention relates to an amphibious vehicle and in particular though not solely to a track system of or for an amphibious vehicle. More particularly but not exclusively it relates to deployment mechanism for lowering and raising tracks from a marine water craft.

2. Description of the Related Art

There is a need for marine water crafts which are capable of negotiating safely and efficiently between land and water. Amphibious capabilities may be required by commercial and recreational boating, the navy, and search and rescue.

Trailer boats may find it hard to navigate slippery or narrow boat ramps to access the sea. Boat ramps may be limited and the use of them is may cause congestions at car parks. Amphibious boats are able to overcome this problem as they have the ability to directly transition between land and water without the assistance of ramps or trailers.

Generally amphibious boats incorporate wheels or tracks which extend and are lowered below the hull. This construction requires hydraulics capable of lifting the boats weight and may compromise on its aesthetic appeal. External wheels or tracks on conventional amphibious boats may cause excess drag in water when the system is submerged. Or they may move the wheels or tracks to a position that is visually not very appealing.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide an amphibious vehicle capable of being reconfigured to operate both on land and in water which overcomes or at least partially ameliorates some of the abovementioned disadvantages or which at least provides the public with a useful choice.

SUMMARY OF THE INVENTION

In a first aspect the present invention may be said to be a water craft comprising:
 a. at least one hull,
 b. at least one or more deployable endless tracks associated with the at least one hull, the endless tracks running on a track assembly comprising a four bar mechanism having an upper member fixed relative the hull, and a lower member that is configured to be actuated between an un-deployed and deployed position, where in a deployed position the upper and lower members of the four bar mechanism are further apart than in an un-deployed position, and
 c. upper guide wheels and lower guide wheels for guiding the endless tracks, wherein the upper guide wheels are fixed relative to the hull and the lower guide wheels are fixed relative the lower member.

In one embodiment, the lower guide wheels are located at a moving pivot point of the planar four bar mechanism.

In one embodiment, the upper and lower members of the four bar mechanism have corresponding upper and lower pivot points.

In one embodiment, an upper member of the four bar mechanism is fixed relative the hull, whilst the lower member and the intermediate members pivotally joined to the upper and lower member are configured to move.

In one embodiment, an actuator is dependent to one or more of the moving members and configured to actuate the four bar mechanism between a deployed position and an un-deployed position.

In one embodiment, the upper guide wheels are located at or near the upper member and the lower guide wheels are located on the lower member.

In one embodiment, the upper guide wheels are located at upper pivot points of the four bar mechanism.

In one embodiment, the lower guide wheels are located at the lower pivot points of the four bar mechanism.

In one embodiment, at least one of the upper guide wheels is a drive wheel configured to drive the endless tracks.

In one embodiment, at least one of the lower guide wheels as a drive wheel configured to drive the endless tracks.

In one embodiment, the drive wheels are driven by one selected from a hydraulic drive, an electric drive and parasitic drive from the prime mover of the watercraft.

In one embodiment, the wheels are configured as sprockets to engage the track.

In one embodiment, the upper wheels are located at least partially within the hull recess.

In one embodiment, upon actuation of the four bar mechanism part of the endless track extends below a lower surface of the hull.

In one embodiment, the lower wheels are configured to move between an un-deployed position at least partially within the hull recess, to a deployed position at least partially out of the hull recess.

In one embodiment, in the un-deployed position the lower wheels are substantially level with the upper wheels.

In one embodiment, in the un-deployed position the upper and lower wheels engage with more than two points of the endless track.

In one embodiment, the un-deployed position the upper and lower wheels engage than parts the endless track that when operating travel in opposite directions.

In one embodiment, the actuator is a hydraulic ram.

In one embodiment, the actuator is an electric actuator.

In one embodiment, the actuator is manually driven.

In one embodiment, the actuator is fixed at one end to the hull, and the other end is fixed to a lever dependent from a moving member.

In one embodiment, the actuator is fixed to the pivot point of a moving member.

In one embodiment, the actuator is fixed to the lower member.

In one embodiment, the four bar mechanism is a parallelogram.

In one embodiment, the upper member is integral with the hull.

In one embodiment, there are three or more intermediate members pivotally joined between the upper member and the lower member.

In one embodiment the continuous track forms a substantially rounded rectangle shape in the un-deployed mode.

In one embodiment, the continuous track forms substantially a rounded rhombus shape in the deployed mode In one embodiment, when deployed and on a bearing surface, the endless track can manoeuvre the watertight hull form over that bearing surface; and wherein, in the un-deployed stowed condition, the endless track has a downward facing surface(s) which provides effectively a water skimming or planing surface.

In one embodiment, the vehicle comprises a plurality of deployable endless tracks per hull.

In one embodiment, the vehicle comprises a plurality of deployable endless tracks on each side of hull.

In one embodiment, the vehicle comprises suspension.

In one embodiment, the suspension comprises hydraulic accumulators that are part of the actuation system.

In one embodiment, the suspension allows the four bar mechanism to controllably rack.

In a second aspect the present invention may be said to be the use of at least one endless track assemblies of a water craft between un-deployed and deployed conditions to correspond to (1) on water and (2) on or onto land use of the craft; wherein a four bar linkage reconfigures the track locus between the loci at such conditions.

In one embodiment, there are two endless track assemblies.

In one embodiment, upper locus points of the track locus stay in the same place during deployment, and lower locus points of the track locus extend away from the upper locus points during deployment.

In a third aspect the present invention may be said to be a water craft having a hull and having an endless track assembly at or adjacent each flank to support, when each has been deployed to an onto land condition from an on water un-deployed condition, the manoeuvre of the craft onto land; wherein each track assembly includes a four bar linkage to reconfigure the track locus from, between and to the un-deployed and deployed loci conditions, and vice versa.

In one embodiment, a hydraulic motor drives each track.

In one embodiment, the un-deployed condition presents a region of its track relative to the hull and/or an extension thereof to minimise water drag.

In one embodiment, the lower part of each track in the on water condition presents a near flush surface-like affect with respect to the hull and/or an extension of it to allow, or at least not prevent, a non-planing to planing transition of the craft under power on water.

In one embodiment, the lower part of each track in the deployed condition extends below the lowest surface of the hull.

In a fourth aspect of the present invention, a water craft as described above wherein the craft is able to plane in its on water condition.

In a fifth aspect the present invention may be said to be of a water craft of a hull form; wherein the water craft comprises at least one stowable yet deployable endless track with drive and deployment linkages; and wherein, when deployed and on a bearing surface, the track can manoeuvre the watertight hull form over that bearing surface; and wherein, in the un-deployed stowed condition, the track with its downward facing surface(s) provides a water skimming or planing surface region of the hull form.

In one embodiment, the bearing surface is a seafloor, lake floor or beach.

In one embodiment, the watertight hull form includes a vee form of a planing water craft when the tracks are stowed.

In a sixth aspect the present invention may be said to be a water craft that includes
 a watertight hull able to render the water craft buoyant,
 a first endless track assembly nestable in a streamlining part and/or extension of the hull in its stowed condition,
 a second endless track assembly nestable in a streamlining part and/or extension of the hull in its stowed condition,
 a deployment/stowing support for each track assembly relative to the hull, and
 a drive for the track of each track assembly whereby, in the non-stowed and deployed condition, the tracks can manoeuvre the water craft relative to a bearing surface;
 wherein each track assembly when nested presents its lowermost track region as substantially a continuation of at least one streamline feature of the streamlining part and/or extension of the hull.

In one embodiment, the bearing surface is a seafloor, lake floor or beach.

In one embodiment, the water craft is water planable notwithstanding the hull is at least in part a vee hull with a flanking wings provided in part by the stowed tracks.

In a seventh aspect the present invention may be said to be a water craft able to plane under power in the water, the water craft being characterised in that (1) the hull at least in part receives when to be un-deployed, a pair of deployable endless tracks able, when deployed, to manoeuvre the water craft with the hull above the ground, seabed or like underlying support, and, (2) each track, when un-deployed and hull received, acts in part as if a planing surface in addition to that or those of the hull itself.

In one embodiment, endless track is defined as closed locus

In an eighth aspect the present invention may be said to be a vehicle with height extendable motive tracks, the vehicle comprising
 a. a chassis,
 b. at least one or more deployable endless tracks, the endless tracks running on an endless track assembly comprising a four bar mechanism having an upper member fixed relative the chassis, and a lower member that is configured to be actuated between an un-deployed and deployed position, where in a deployed position the upper and lower members of the four bar mechanism are further apart than in an un-deployed position, and
 c. upper guide wheels and lower guide wheels for guiding the endless tracks, wherein the upper guide wheels are fixed relative to the chassis and the lower guide wheels are fixed relative the lower member.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

The term 'four bar linkage' is defined to include its normal technical meaning (of which trapezoidal is a special case) where there are 4 bars but also to include where there is an equivalent for any one or more of actual bars (e.g. a reinforced hull part between pivots of two of the bars). The preferred embodiment of the invention is an isosceles trapezoid planar four bar linkage.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

DESCRIPTION OF THE DRAWINGS

The invention will now be described by way of example only and with reference to the drawings in which:

FIG. 1: shows a side schematic view of the track assembly in a deployed condition.

FIG. 2: shows a side schematic view of the track assembly in an un-deployed condition.

DETAILED DESCRIPTION OF THE PREFERRED EMBODIMENTS

Figure 3:
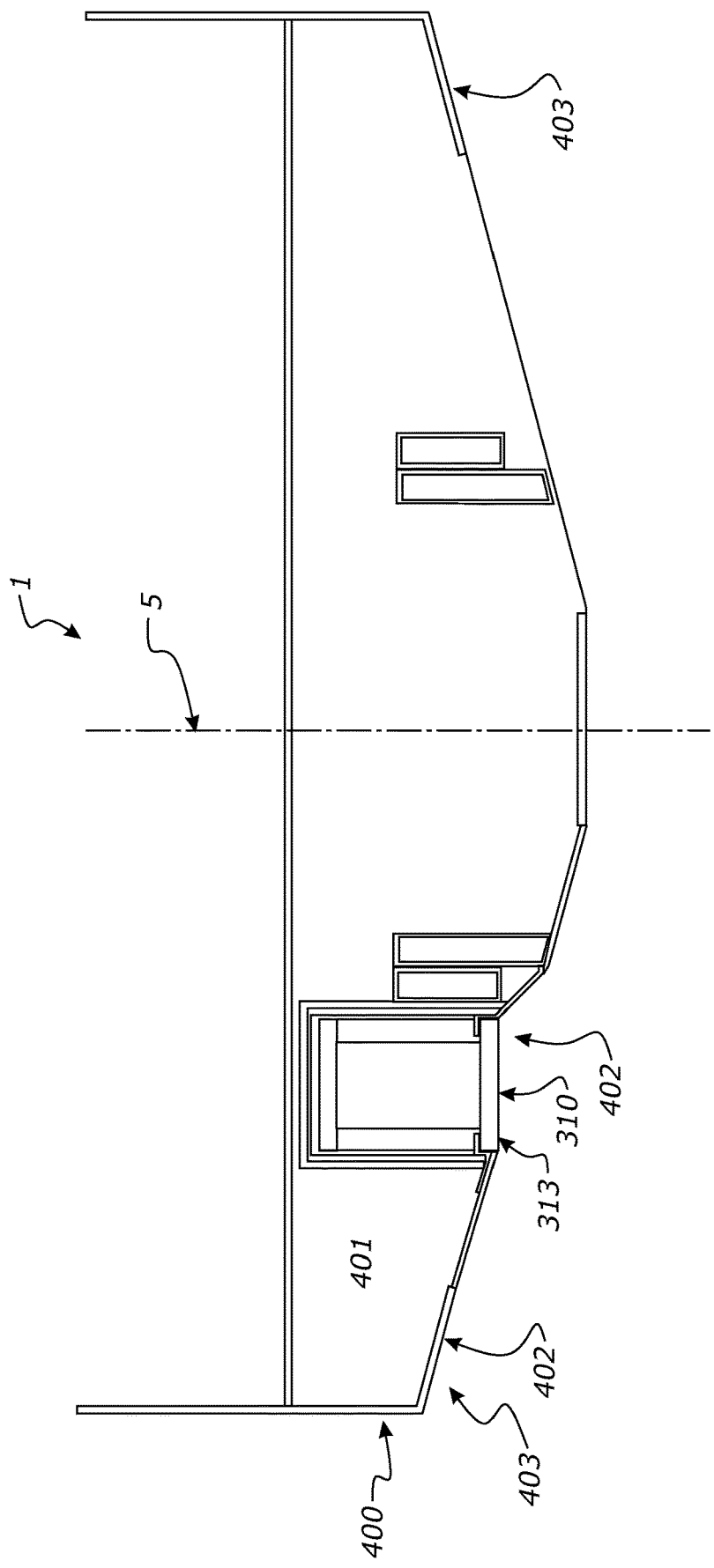
FIG. 3: shows a rear cross sectional view of a hull of an amphibious vehicle and a portion of a track assembly.
Figure 4:
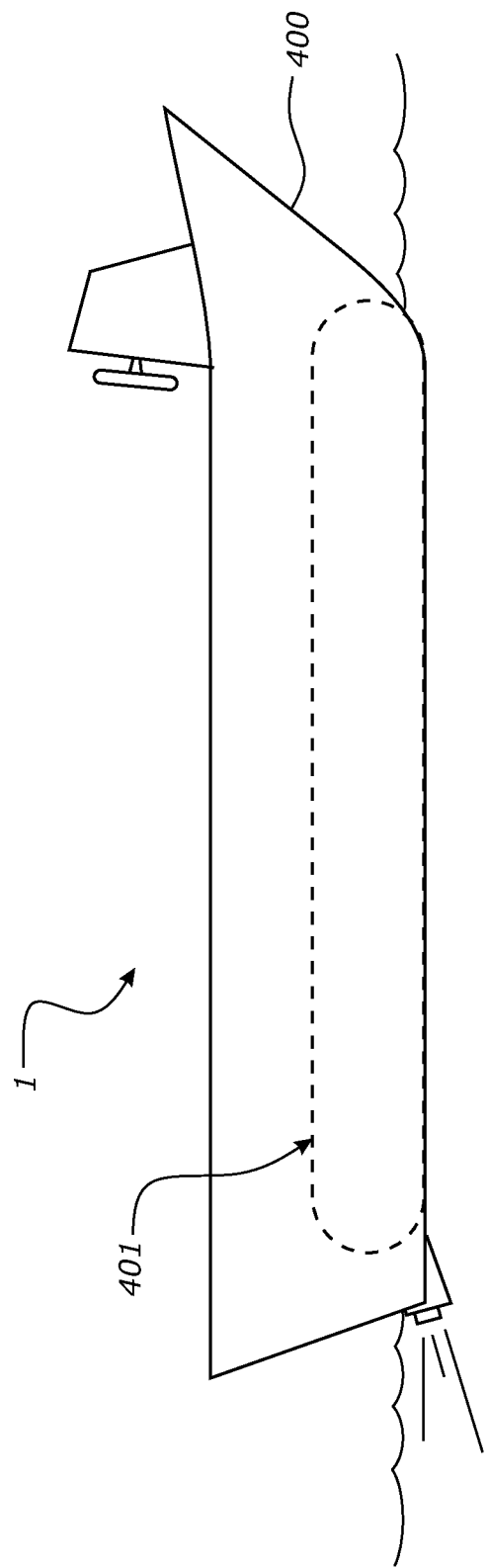
FIG. 4: shows a side view of an amphibious vehicle with the hull with the track assembly in an un-deployed condition.
Figure 5:
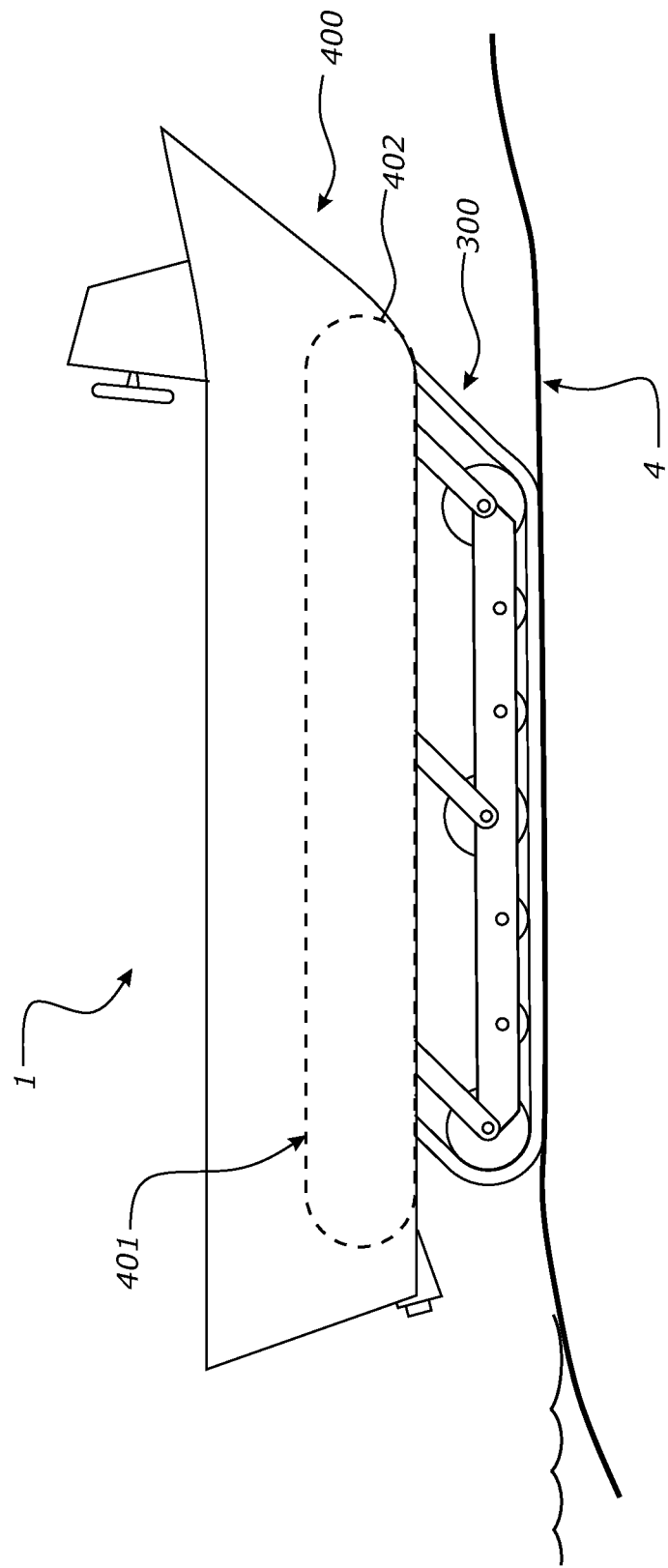
FIG. 5: shows a side view of the amphibious vehicle of FIG. 4, with the track assembly in a deployed condition.

With reference to the above drawings, in which similar features are generally indicated by similar numerals, an amphibious vehicle according to a first aspect of the invention is generally indicated by the numeral 1.

In one embodiment now described, there is provided a track assembly 300 configured for an amphibious vehicle 1. The track assembly 300 comprises a continuous track 310, located around the notional periphery of a plurality of associated wheels 200 to drive and/or guide the track 310. The track assembly 300 may further comprise various actuated members to allow the actuation of the track assembly 300 between two conditions.

Preferably the track assembly 300 is located within a hull 400 recess of a hull of the vehicle 1. In the preferred embodiment the track assembly 300 is able to move between an un-deployed condition 2 where the majority of the track assembly 300 is within the hull recess 401, and a deployed condition 3 (as shown in FIGS. 1 and 2) where part of the track assembly 300 is exposed out of a hull recess 401.

The track assembly 300 can deploy from the hull when the vehicle is in or floating in water or when the hull of the vehicle is on or nearing land. The track assembly 300 can deploy directly on a bearing surface 4 to lift the hull off the bearing surface or the track assembly 300 can deploy completely before contacting the bearing surface 4. The bearing surface 4 may be any type of landmass such as a lake floor, a seafloor or a foreshore or ramp. In other embodiments, the track assembly 300 may be installed in other types of vehicles such as land vehicles, like tanks, agricultural or military vehicles.

In the preferred embodiment the track assembly 300 is located in a hull recess 401 of a hull 400 of a vehicle 1. The vehicle 1 may have one or more track assemblies. An example of a single track assembly watercraft is a jet ski with a track assembly 300 located along its midline/mid-sagittal plane (not shown). An example of a dual track assembly watercraft is shown in FIG. 3 where the left-hand side of a watercraft is shown with a track assembly 300. The watercraft and track assembly is symmetrical around the mid-sagittal plane 5. Other watercraft or amphibious vehicles that may utilise track assembly of the present invention are catamarans and trimarans where the pontoon of said vehicle comprises a track assembly 300.

In the preferred embodiment the mechanism that allows the track assembly 300 to move between the two conditions is a four bar linkage mechanism 306. The four bar linkage mechanism 306 is configured to allow the track assembly 300 to move between the deployed and un-deployed conditions. The track assembly 300 further comprises an actuator to actuate said four bar linkage to actuate the track between the deployed and un-deployed conditions. The actuator reacts off the hull of the vehicle to apply a force to the mechanism.

The four bar linkage mechanism 306 in a first embodiment comprises an upper member 301 which is fixed relative to the hull 400 of the vehicle 1. The upper member 301 may be integral with the hull 400 of the vehicle 1. As shown in FIG. 1 the upper member 301 may be part of the hull and keeps the upper pivot points 304 of the four bar linkage mechanism 306 a fixed distance away from each other and fixed relative the hull 400.

The four bar linkage mechanism 306 further comprises moving members that move relative to the hull; intermediate members 303 and a lower member 302. The upper member 301 is pivotally joined to the lower member 302 by the intermediate members 303. In one embodiment actuation of any one of the moving members will provide actuation of the four bar mechanism inherently. The four bar mechanism 306 as shown in FIG. 1 may comprise multiple intermediate members 303 as shown. In the shown example in FIG. 1 the four bar mechanism has three intermediate members. Depending on the size of the track system and associated watercraft the four bar mechanism 306 may have two or more intermediate members.

In the preferred embodiment the four bar mechanism 306 is a planar four bar linkage mechanism that restricts the actuation and movement of the four bar mechanism 306 to a single plane. Preferably the four bar mechanism is a parallelogram four bar linkage mechanism which means that the upper member 301 and the lower member 302 are parallel to each other at all times. In alternative embodiments the upper member 301 and lower member 302 are not or do not remain parallel to each other. As a skilled person in the art will realise, differing the length of the upper and lower members, or intermediate members, will cause different geometries between deployed and un-deployed conditions. Different geometries may be desired in some design situations, for example where the upper member cannot be parallel, or if the hull is desirably more angled for a particular seaway. The track assembly and vehicle is so designed, and the track assembly and vehicle so weighted, so that the amphibious vehicle 1 is prevented from pitching fore or aft during travel on a bearing surface in the deployed condition. Preferable the location of such items such as the motor, users, fuel and payload are distributed so as to prevent tipping fore and aft whilst the vehicle is in the deployed condition.

As the four bar linkage mechanism is actuated to a deployed condition 3 the tracks 310 are partly extended downwards away from the hull 400. The endless tracks 310 can run about the periphery of the notional track system by idling around multiple wheels 200. In one embodiment there are upper wheels 201 and lower wheels 202. The upper wheels 201 correspond to a portion of the endless track at or near or on the upper member 301. The lower wheels 202 correspond to a region of the endless track at or near or located on the lower member 302. As can be seen from FIG. 1 there are pivoting wheels 205 that are able to move between the deployed and un-deployed conditions. The pivoting wheels 205 are all lower wheels 202. Optionally, there are intermediate guide or idler or tension wheels 204 intermediate the lower wheels 202. The guide 204 wheels keep tension on the endless tracks on the bearing surface 4, as is typical with all endless track systems.

A person skilled in the art may realise there are many ways of configuring the actuation assembly 500 to actuate the four bar mechanism 306 to move the track assembly 300 between the un-deployed condition 2 and the deployed condition 3. The actuator assembly 500 in a preferred embodiment comprises a ram 501 which is configured to attach at one end to the fixed hull or upper member and at the other end to one of the moving members i.e. to either the intermediate members 303, the lower members 302, the lower pivot points 305 etc.

In a preferred embodiment the ram 501 is configured to attach to a lever 504 which is fixed rigidly at right angles, about the respective point, to an intermediate member 303. For example, the actuation of the ram 501 drives the lever 504 which in turn drives the intermediate member 303 about the pivot point 304. The ram 501 may be an electric ram, a hydraulic ram (double or single acting, but preferably double) or in other embodiments the actuation system may be dependent of the power source of the prime mover of the watercraft 1. A light battery system as an example may be used to actuate a track assembly 300 of a jet ski. Larger marine vessels, such as heavy commercial or trailer sailors, would use more substantial actuation means such as hydraulic power. There may be more than one ram 500 in the actuation system. There may be a ram located at each of the intermediate members or lower pivot points.

One or more of a or the wheels 200 may be a driving wheel. In a preferred embodiment the driving wheel is one of the upper wheels 201. As shown in FIG. 1 the only driving wheel is driving wheel 203, as an example only. Any of the wheels, and preferably the upper wheels 201, are driving wheels. The driving wheel(s) 203 are preferably driven by a motor. In a preferred embodiment the motor is a hydraulic motor (not shown). In alternative embodiments the motor is an electric motor, a hydraulic motor, a geared system, or powered by the power system of the watercraft 1. The drive wheel 203 drives the endless track 310 by engaging with engagements on the internal side the track much like a sprocket and chain or gear system would. Following on from this in the preferred embodiment all of the upper wheels and lower wheels have a similar type of engagement to engage with the endless tracks 310. The engagement system between the wheels and endless track, and the drive system to drive the drive wheels may be the same as used in known continuous track systems Preferably in the un-deployed condition 2 the lower most presented surface 303 of the or each track 310 is planar with a lower or downward facing surface 402 or planing surface 402 of the hull 400 of the vehicle 1. The lower most presented surface is flush with the hull at the entrance of the recess. This allows the track to reduce its resistance to flow of water past this region of hull from the bow to aft direction. However in other embodiments the track assembly 300 partly extends below the bottom of the hull at all times when un-deployed. The track assembly 300, or a part thereof, may act as a strake on the hull.

Preferably the hull recess 401 is so shaped so it is at least the width of the track so it is able to snugly receive the lowermost presented surface 310 of the tracks as shown in FIG. 3. The same can be said about the length of the hull recess with respect to the length of the continuous track's lowermost surface 310 when the track assembly is in the un-deployed condition. Preferably the lowermost surface 310 of the continuous track that is presented outwards of the hull fits snugly around its periphery within the hull recess 401 to form a cavity behind it. Furthermore the lowermost surface 310 is substantially planar to fit with the substantially planar hull recess opening. Preferably the hull recess is of a substantially rectangular in plan shape to match the shape of the lowermost surface 310. In one embodiment the hull recess opening is below the waterline or is contacted by the water during operation of the amphibious vehicle 1.

In alternative embodiments there may be a cover (not shown) to further cover the track assembly 300 fully within the hull recess 401. The cover further prevents any ingress of water into the hull recess 401.

In a preferred embodiment of the entire track assembly 300, optionally including the hull recess (i.e. an open sided box), is fully self-contained so as to be able to be installed in a water craft or amphibious vehicle hull. This allows retrofitting of vehicles to use the track assembly of the current invention. The modular self-contained unit would come complete with all fittings required to install the track assembly in the hull of a vehicle, including the reinforcing means required to reinforce the hull recess with the hull of the vehicle.

The vehicle 1 preferably has flanks 403 on the port and starboard sides of the hull that may be formed with the track assembly. The watercraft preferably presents a planing surface 402 comprising of the fixed part of the hull and the lower most surface of the track presented, when the assembly is in its un-deployed 2 condition, to reduce the its impact on drag on water flowing over the hull. The planing surface 402 is best seen in FIG. 3 with a lower surface 313 of the endless tracks 310 being substantially uninterrupted with the lower surface of the hull 402. Preferably at least parts of the vehicle, hull and track assembly is composed of a typical marine vessel material such as plastics, aluminium, steel or fibreglass. Other composite materials may be used, such as carbon fibre. The hull and hull recess may also be formed of a combination of the above materials.

Furthermore the track assemblies comprise suspension components to take the shock of the track assemblies contacting the bearing surface, or whilst travelling on land, to prevent damage to the hull (or chassis) and increase the comfort of the user. The suspension components can be hydraulic accumulators to allow the 4 bar mechanism to give/rack towards the un-deployed condition, and/or accumulators in the drive system to prevent track snatch. The accumulators can be part of the actuation system, or can be separate suspension components. A person skilled in the art will see there are many ways to provide suspension to a tracked system. The actuation and 4 bar system lends itself well to suspension, as the racking of the 4 bar mechanism inherently allows give/suspension.

As viewed in this specification the periphery of the tracks 310 may be described as a locus. Where pivot points are described in this specification with relation to a wheel it is or may be described as the rotational axis of said wheel as well. Furthermore the four bar mechanism has been described in some embodiments as planar, this comprises the pivot points of the mechanism all having pivot axes perpendicular to each other, and only perpendicular to each other, i.e. not capable of pivoting about other axes.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

What is claimed is:

1. A water craft comprising:
   a. at least one hull,
   b. at least one or more deployable endless tracks associated with the at least one hull, the endless tracks running on a track assembly comprising a four bar mechanism comprising
      I. an upper member fixed relative the hull,
      II. a lower member able to move between an un-deployed and deployed position, where in the deployed position the upper and lower members of the four bar mechanism are further apart than in the un-deployed position,
      III. at least two intermediate members pivotally joined to both the upper and lower member to allow the lower member to move between the un-deployed and deployed position, and
   c. upper guide wheels and lower guide wheels for guiding the endless tracks, wherein the upper guide wheels are fixed relative to the hull and the lower guide wheels are fixed relative the lower member.

2. A water craft as claimed in claim 1, wherein the lower guide wheels are located at a moving pivot point of the four bar mechanism.

3. A water craft as claimed in claim 1, wherein the four bar mechanism is planar.

4. A water craft as claimed in claim 1, wherein the track assembly is at least partially within a hull recess associated with the hull.

5. A water craft as claimed in claim 1, wherein the upper and lower members of the four bar mechanism have corresponding upper and lower pivot points.

6. A water craft as claimed in claim 1, wherein the lower member and intermediate members are configured to move relative the hull.

7. A water craft as claimed in claim 1, wherein an actuator is dependent to one or more of the lower member and intermediate members and configured to actuate the lower member between the deployed position and the un-deployed position.

8. A water craft as claimed in claim 1, wherein the upper guide wheels are located at or near the upper member and the lower guide wheels are located on the lower member.

9. A water craft as claimed in claim 1, wherein at least one of the upper guide wheels is a drive wheel configured to drive the endless tracks.

10. A water craft as claimed in claim 1, wherein the upper wheels are located at least partially within the hull recess.

11. A water craft as claimed in claim 1, wherein upon actuation of the four bar mechanism part of the endless track extends below a lower surface of the hull.

12. A water craft as claimed in claim 1, wherein the lower wheels are configured to move between an un-deployed position at least partially within the hull recess, to a deployed position at least partially out of the hull recess.

13. A water craft as claimed in claim 1, wherein in the un-deployed position the lower wheels are substantially level with the upper wheels.

14. A water craft as claimed in claim 7, wherein the actuator is fixed at one end to the hull, and the other end is fixed to one selected from the lower member, the upper member and a lever dependent from an lower member or intermediate member.

15. A water craft as claimed in claim 1, wherein the upper member is integral with the hull.

16. A water craft as claimed in claim 1, wherein when deployed and on a bearing surface, the endless track can manoeuvre the watertight hull form over that bearing surface; and wherein, in the un-deployed stowed condition, the endless track has a downward facing surface(s) which provides effectively a water skimming or planing surface.

* * * * *